US006876368B2

(12) United States Patent
Dove et al.

(10) Patent No.: US 6,876,368 B2
(45) Date of Patent: Apr. 5, 2005

(54) SYSTEM AND METHOD FOR DEPLOYING A GRAPHICAL PROGRAM TO A PDA DEVICE

(75) Inventors: Andrew Dove, Austin, TX (US); Hugo Andrade, Austin, TX (US); Darshan Shah, Round Rock, TX (US)

(73) Assignee: National Instruments Corporation, Austin, TX (US)

(*) Notice: Subject to any disclaimer, the term of this patent is extended or adjusted under 35 U.S.C. 154(b) by 344 days.

(21) Appl. No.: 09/974,601

(22) Filed: Oct. 9, 2001

(65) Prior Publication Data

US 2003/0035004 A1 Feb. 20, 2003

Related U.S. Application Data

(60) Provisional application No. 60/312,133, filed on Aug. 14, 2001.

(51) Int. Cl.[7] .................................................. G09G 5/00
(52) U.S. Cl. ...................................... 345/762; 345/864
(58) Field of Search ............................... 345/156, 762, 345/763, 764, 835, 864, 967; 717/109; 463/39

(56) References Cited

U.S. PATENT DOCUMENTS

| | | | | |
|---|---|---|---|---|
| 5,392,207 A | * | 2/1995 | Wilson et al. ................ | 700/64 |
| 5,638,299 A | * | 6/1997 | Miller ......................... | 702/127 |
| 5,724,074 A | * | 3/1998 | Chainani et al. ............ | 345/474 |
| 6,173,438 B1 | | 1/2001 | Kodosky et al. | |
| 6,219,628 B1 | | 4/2001 | Kodosky et al. | |

OTHER PUBLICATIONS www.mathworks.com "Real–Time Workshop 4 for generating optimized, portable, and customizable code from Simulink models", Oct. 2000.*
DSPACE Solutions for Control Catalog 1999, pp. 30–35 and 48–63.*
Beland et al., "Lego Mindstorms The Structure of an Engineering Revolution", Dec. 15, 2000.*
Gindling et al., "LEGOsheets: A Rule–Based Programming, Simulation and Manipulation Environment for the LEGO Programmable Brick", 1995.*
www.mathworks.com "Real–Time Workshop 4 for generating optimized, portable, and customizable code from Simulink models," Oct. 2000, 6 pages.

* cited by examiner

*Primary Examiner*—Mark Zimmerman
*Assistant Examiner*—Enrique L. Santiago
(74) *Attorney, Agent, or Firm*—Meyertons Hood Kivlin Kowert & Goetzel, P.C.; Jeffrey C. Hood; Jason L. Burgess (57) ABSTRACT

A system and method for deploying one or more graphical programs on a portable computing device, such as a personal digital assistant (PDA) device. One or more selected graphical programs may be programmatically converted to an executable format that can be executed by the portable computing device. For example, the graphical programs may be initially represented as a plurality of data structures that define or specify the operation of the respective graphical programs, and conversion software program may operate to access these data structures from memory and convert the data structures to an executable format suitable for the portable computing device. The executable may be transferred to the portable computing device for execution.

19 Claims, 7 Drawing Sheets

SYSTEM AND METHOD FOR DEPLOYING A GRAPHICAL PROGRAM TO A PDA DEVICE

PRIORITY CLAIM

This application claims benefit of priority of U.S. provisional application Ser. No. 60/312,133 titled "System and Method for Deploying A Graphical Program to a PDA Device" filed Aug. 14, 2001, whose inventor was Andrew Dove.

FIELD OF THE INVENTION

The present invention relates to the field of graphical programming, and more particularly to a system and method for deploying a graphical program on a portable computing device, such as a personal digital assistant (PDA) device.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures may be automatically constructed which characterize an execution procedure which corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for performing an instrumentation, measurement or automation function, such as measuring a Unit Under Test (UUT) or device, controlling or modeling instruments, controlling or measuring a system or process, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation, and numerical analysis, as well as for any type of general programming.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program or VI, and may include other icons which represent devices being controlled. The front panel may be comprised in a single window of user interface elements, or may comprise a plurality of individual windows each having one or more user interface elements, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel may comprise front panel objects, e.g., the GUI, embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures and/or program instructions. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using a graphical user interface, e.g., a front panel as described above. The input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, image processing/machine vision applications, and motion control, among others.

In the prior art, graphical programs have been limited to certain types of computing platforms, such as desktop computer systems and workstations. With the proliferation of new types of computing devices, it would be desirable to expand the platforms on which a graphical program can execute. In particular it would be desirable to enable a graphical program to execute on a portable computing device, such as a personal digital assistant (PDA) or mobile terminal.

In general, small form factor devices such as PDAs present certain issues for programs with graphical content, such as graphical user interfaces. For example, PDAs generally have reduced processor and memory capabilities compared to standard desktop computers, and also generally have more limited display capabilities. PDAs also generally have reduced capabilities in the types of programs they can execute.

SUMMARY OF THE INVENTION

One embodiment of the present invention comprises a system and method for deploying one or more graphical programs on a portable computing device. In the preferred embodiment, the portable computing device comprises a personal digital assistant (PDA) device. Other examples of portable computing devices include mobile terminals, handheld computers, wearable devices (e.g., wristwatch computers), "smart" cellular telephones, game consoles, global positioning system (GPS) units, electronic textbook devices, etc.

The one or more graphical programs may first be created, e.g., may be created using a graphical programming development environment executing on a desktop computer system or workstation. The graphical program(s) may be created or assembled by the user arranging on a display a plurality of nodes or icons and then interconnecting the nodes to create the graphical program(s). In response to the user assembling the graphical program, data structures (or code) may be created and stored which represent the graphical program. The nodes may be interconnected in one or more of a data flow, control flow, and/or execution flow format. The graphical program may thus comprise a block diagram having a plurality of interconnected nodes or icons that visually indicate the functionality of the program. The graphical program may implement any desired function. The graphical program may also include a user interface portion or front panel portion. Where the graphical program includes a user interface portion, the user may assemble the user interface on the display. Alternatively, the user interface portion may be specified in the block diagram. As one example, the user may use the LabVIEW graphical programming development environment to create the graphical program.

In one embodiment, the user may then select an option to build an executable for the portable computing device, e.g., PDA device. For example, the user may select an option from a menu in the graphical programming development environment to create a "build" or select an option to build an executable that will execute on a portable computing device.

In response to the user selecting this build option, the user may be prompted to specify or select one or more graphical programs from which the user desires to create the executable. As one example, this may involve selecting the graphical program(s) created as described above. In one embodiment, the user may select one main graphical program and a plurality of sub-graphical programs. Alternatively, the user may select a single graphical program or a plurality of different graphical programs for which the user desires to create an executable. The user may select the one or more graphical programs in any of various ways. For example, selecting the graphical program(s) may comprise the user browsing through a file system to obtain the graphical programs, or dragging and dropping icons from a palette onto an icon for the PDA, or other appropriate selection methods.

In an alternative embodiment, the user may not select the "build" option and then specify the graphical program(s) to include in the build. For example, if the user is currently viewing or editing a graphical program within the graphical programming development environment, then the user may simply select a "Deploy to PDA" menu option to deploy the current graphical program to the portable computing device. As another example, the system may display a configuration diagram which includes icons for respective graphical programs and an icon for the PDA device. In this example, the user may deploy one or more graphical programs on a PDA by dragging and dropping one or more graphical program icons on the PDA icon.

The one or more selected graphical programs may then be converted to an executable format that can be executed by the portable computing device. A software program may operate to automatically, i.e., programmatically, convert the one or more graphical programs to the executable format. For example, the one or more graphical programs may be initially represented as a plurality of data structures that define or specify the operation of the respective graphical programs. The conversion software program may operate to access these data structures from memory and convert the data structures to an executable format, e.g., machine language code or an interpretable script or other similar executable format, wherein this executable can be executed by the portable computing device.

In one embodiment of the conversion process, the graphical program is converted to an executable by first converting the graphical program into a text-based program, such as a C language program. The text-based program may then be compiled to machine code to produce the executable code, wherein the executable code can be executed by the portable computing device. The steps of converting the graphical program into a text-based program and compiling the text-based program occurs programmatically, i.e., is performed by software, and is preferably performed invisibly to the user.

During the conversion process, various run-time software may be used to facilitate generation of the executable from the graphical program(s). For example, this run-time software may comprise serial, interface, and file I/O software, as well as user interface software, math software, and data type software. This run-time software may be useful and/or necessary because the portable computing device may not inherently include a graphical program execution engine. Hence, the executable may require additional information that is not already contained within the data structures that correspond to the graphical programs that have been created.

The executable may be transferred to the portable computing device, e.g., PDA. In one embodiment, this may involve using a transfer program, such as a "hot sync" program to transfer the executable to the portable computing device. In one embodiment, the portable computing device may be physically coupled to the computer system via a wire or cable, e.g., through a serial cable, and the executable may be transferred over this cable to the portable computing device. In another embodiment, the executable may be transferred in a wireless fashion to the portable computing device and deployed on the device in a wireless fashion.

The executable may then be executed on the portable computing device, e.g., PDA. As noted above, a graphical program may comprise a block diagram and may further comprise a user interface or front panel. During execution of the executable on the portable computing device, the portable computing device may be operable to display at least a portion or all of the user interface or front panel of the original one or more graphical programs. The user may interact with this user interface or front panel to control the executable executing on the portable computing device. For example, where the graphical program performs a measurement function, the user interface or front panel may be used to control the graphical program to accomplish various measurement or automation functions.

The graphical user interface system of the portable computing device may not fully support all of the possible control and indicator icons present in the user interface or front panel of the original graphical program. However, the user interface software comprised in the run-time software that is used during the conversion process may be used to provide appropriate program instructions for displaying or representing different user interface or front panel elements.

In one embodiment of the method, one or more graphical programs that are desired for execution by the executable are not converted to executable format for transfer to the portable computing device, but rather remain on the host computer system. In this embodiment, the executable may include calls to one or more graphical programs that reside on the host computer system. Thus, during execution of the executable on the portable computing device, the executable may be operable to call these graphical programs that reside on the host computer system. As one example, one or more of the graphical programs which are deployed on the portable computing device may include a "call by reference node", wherein this node is operable when executed to call a graphical program on a computer system separate from the portable computing device. Thus, the executable may call and remotely invoke a graphical program, e.g., through a wireless means or through a physical connection, such as a serial connection. The executable executing on the PDA may also call and remotely invoke other types of programs as well.

In one embodiment, the graphical program executing on the portable computing device may be debugged using a desktop computer system. For example, the desktop computer system may display an image of the block diagram of the graphical program that is actually executing on the portable computing device. This block diagram may be viewed and used by the user in various debugging modes such as single stepping, setting break points, execution highlighting, etc.

In one embodiment, during execution of the graphical program(s) on the portable computing device, the portable computing device may be operable to transfer data to an external computer system, such as a desktop computer system. A conduit program may execute on the desktop computer system and may receive data according to a standard or proprietary format. For example, where the desktop computer system is running the LabVIEW graphical programming system, the conduit program executing on the desktop computer may convert data received from the portable computing device to a "datalog" format, which is a proprietary format used by LabVIEW which enables LabVIEW to view and use the data.

In one embodiment, a data acquisition module may be coupled to the PDA and used to acquire data from an external source, such as through a sensor or transducer. The graphical program executing on the portable computing device may store and/or analyze the data received from the data acquisition module.

BRIEF DESCRIPTION OF THE DRAWINGS

A better understanding of the present invention can be obtained when the following detailed description of the preferred embodiments is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. patent application Ser. No. 09/617,600 titled "Graphical Programming System with Distributed Block Diagram Execution and Front Panel Display," filed Jun. 13, 2000.

U.S. patent application Ser. No. 09/745,023 titled "System and Method for Programmatically Generating a Graphical Program in Response to Program Information," filed Dec. 20, 2000.

The LabVIEW and BridgeVIEW graphical programming manuals, including the "G Programming Reference Manual", available from National Instruments Corporation, are also hereby incorporated by reference in their entirety.

Figure 1:
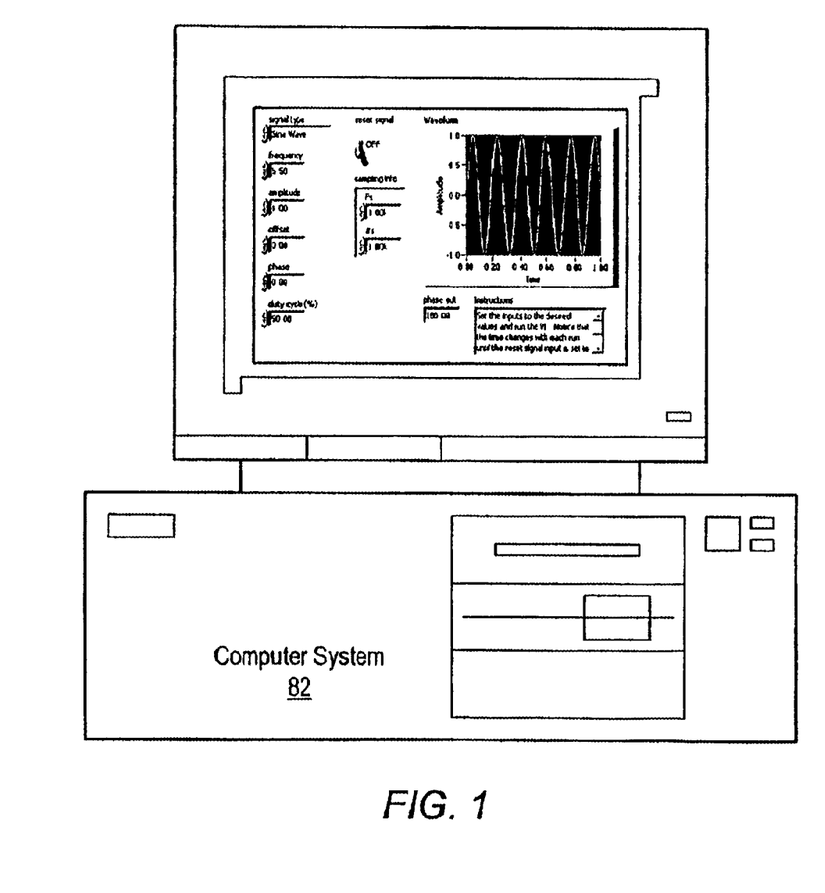
FIG. 1 illustrates a computer system operable to deploy a graphical program onto a portable computing device, such as a personal digital assistant (PDA), so that the portable computing device can execute the graphical program.

FIG. 1—Computer System

FIG. 1 illustrates a computer system 82 operable to deploy a graphical program onto a portable computing device, such as a personal digital assistant (PDA) or mobile terminal, so that the portable computing device can execute the graphical program. The computer system 82 may be any type of computer system, including a personal computer system, mainframe computer system, workstation, network appliance, Internet appliance, television system, or other device. In general, the term "computer system" can be broadly defined to encompass any device having at least one processor that executes instructions from a memory medium. The portable computing device may also be known as a handheld, palmtop, or personal information manager.

As shown in FIG. 1, the computer system 82 may include a display device operable to display the graphical program to be deployed. For example, the display device may display a block diagram and/or a graphical user interface or front panel of the graphical program.

The computer system 82 may include a memory medium (s) on which one or more computer programs or software components according to one embodiment of the present invention may be stored. For example, the graphical program to be deployed may be stored on the memory medium of the computer system 82. Also, the memory medium may store a graphical programming development environment application used to create the graphical program, as well as software operable to convert and/or deploy the graphical program on the portable computing device. The memory medium may also store operating system software, as well as other software for operation of the computer system.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

In the present application, the term "graphical program" or "block diagram" is intended to include a program comprising graphical code, e.g., two or more nodes or icons interconnected in one or more of a data flow, control flow, or execution flow format, wherein the interconnected nodes or icons may visually indicate the functionality of the program. The nodes may be connected in one or more of a data flow, control flow, and/or execution flow format. The nodes may also be connected in a "signal flow" format, which is a subset of data flow. Thus the terms "graphical program" or "block diagram" are each intended to include a program comprising a plurality of interconnected nodes or icons which visually indicate the functionality of the program.

Examples of graphical program development environments that may be used to create graphical programs include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Northwoods Software, Khoros from Khoral Research, SnapMaster from HEM Data, and VisSim from Visual Solutions, ObjectBench by SES (Scientific and Engineering Software), and VisiDAQ from Advantech, among others. In the preferred embodiment, the system uses the LabVIEW graphical programming system available from National Instruments.

A graphical program may also comprise a graphical user interface or front panel. The graphical user interface may comprise any type of graphical user interface, e.g., depending on the computing platform. In one embodiment the graphical user interface may comprise one or more windows, such as those used in window-based user interface systems such as provided by the Macintosh Operating System, Microsoft Windows, the X Window System, etc. The graphical user interface may include a plurality of user interface elements or front panel objects, including indicators for displaying output of the graphical program and/or controls for specifying program input to the graphical program. Examples of user interface controls and indicators include charts, graphs, push buttons, knobs, numeric controls, text boxes, check boxes, list boxes, etc. The graphical user interface may also include any of various other types of user interface elements, such as menu bars, popup context menus, window close buttons, etc. The user interface elements may also include other icons which represent devices being controlled.

The user interface portion may be contained in the block diagram or may be contained in one or more separate panels or windows. The user interface or front panel may be comprised in a single window of user interface elements, or may comprise a plurality of individual windows each having one or more user interface elements, wherein the individual windows may optionally be tiled together. As another example, the user interface or front panel may comprise user interface or front panel objects, e.g., the GUI, embedded in the block diagram. The user interface of a graphical program may display only output, only input, or both input and output. Further, in some embodiments the user interface or front panel of a graphical program may enable the user to interactively control or manipulate the input being provided to the graphical program.

It is noted that when the graphical program is deployed on the portable computing device, the user interface or front panel of the graphical program may be altered. For example, some portable computing devices, such as PDA's, typically do not support a full window-based user interface system. Thus, the user interface elements of the original graphical program may be changed or translated into user interface elements that are available on the target portable computing device. For example, in some instances this may comprise re-arranging or re-sizing user interface elements, changing graphical elements into text elements, etc.

Figure 1A:
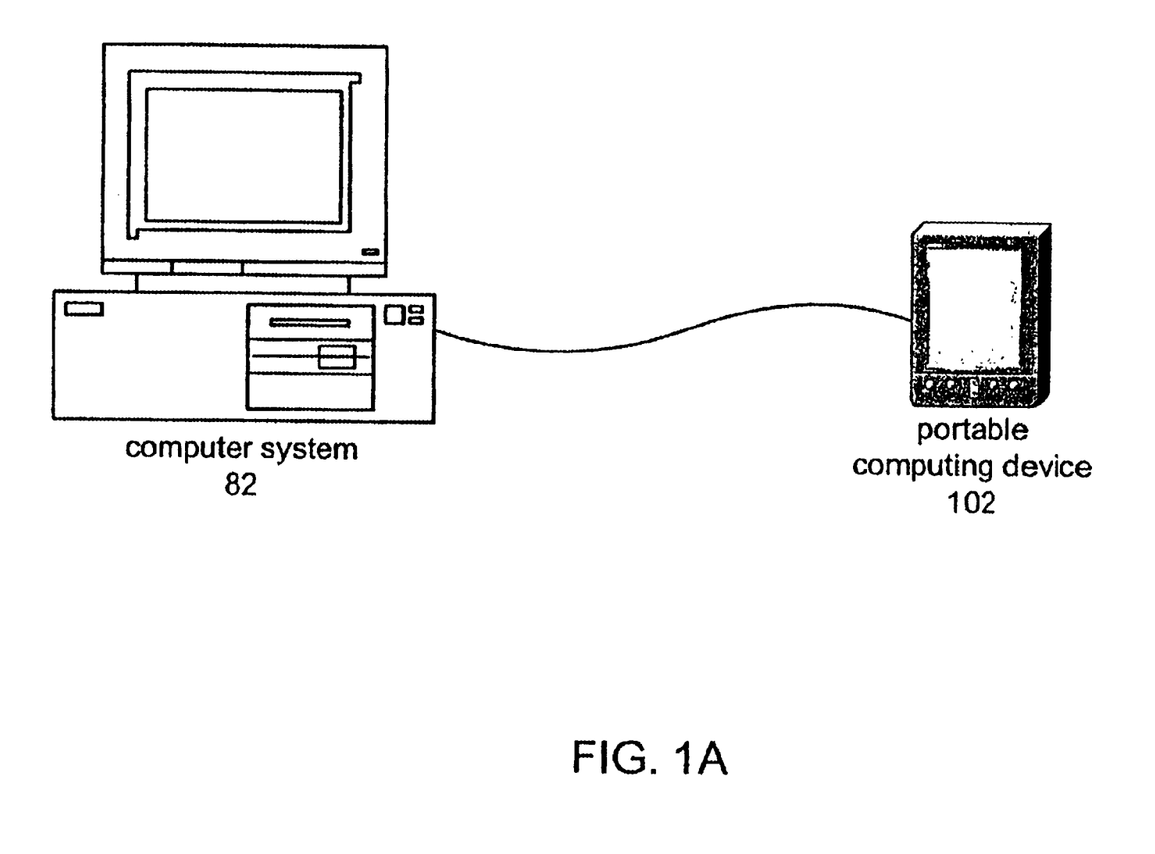

FIG. 1A—Portable Computing Device Coupled to a Desktop Computer System

FIG. 1A illustrates a system including the computer system 82 of FIG. 1 and a portable computing device 102, such as a PDA or mobile terminal. As described above, the computer system 82 may be operable to deploy a graphical program onto the portable computing device 82 for execution.

In one embodiment, the portable computing device 102 may be coupled to the computer system 82 via a wire or cable. As one example, the portable computing device 102 may be coupled to the computer system 82 through a serial cable, and the graphical program may be transferred over this serial cable to the portable computing device 102.

In another embodiment, the portable computing device 102 may not be physically attached to the computer system 82, and the graphical program may be transferred to the portable computing device 102 using a wireless communication protocol. In various embodiments, any of various wireless protocols or techniques may be utilized in deploying the graphical program on the portable computing device 102.

In another embodiment, the portable computing device 102 may be located remotely from the computer system 82, and the graphical program may be transferred to the portable computing device 102 over a network, such as a LAN (local area network), WAN (wide area network), the Internet, or an Intranet, among others. For example, for a portable computing device 102 with an Internet connection, the device may be connected to the Internet and may receive data representing the graphical program sent over the Internet by the computer system 82.

Figure 2A:
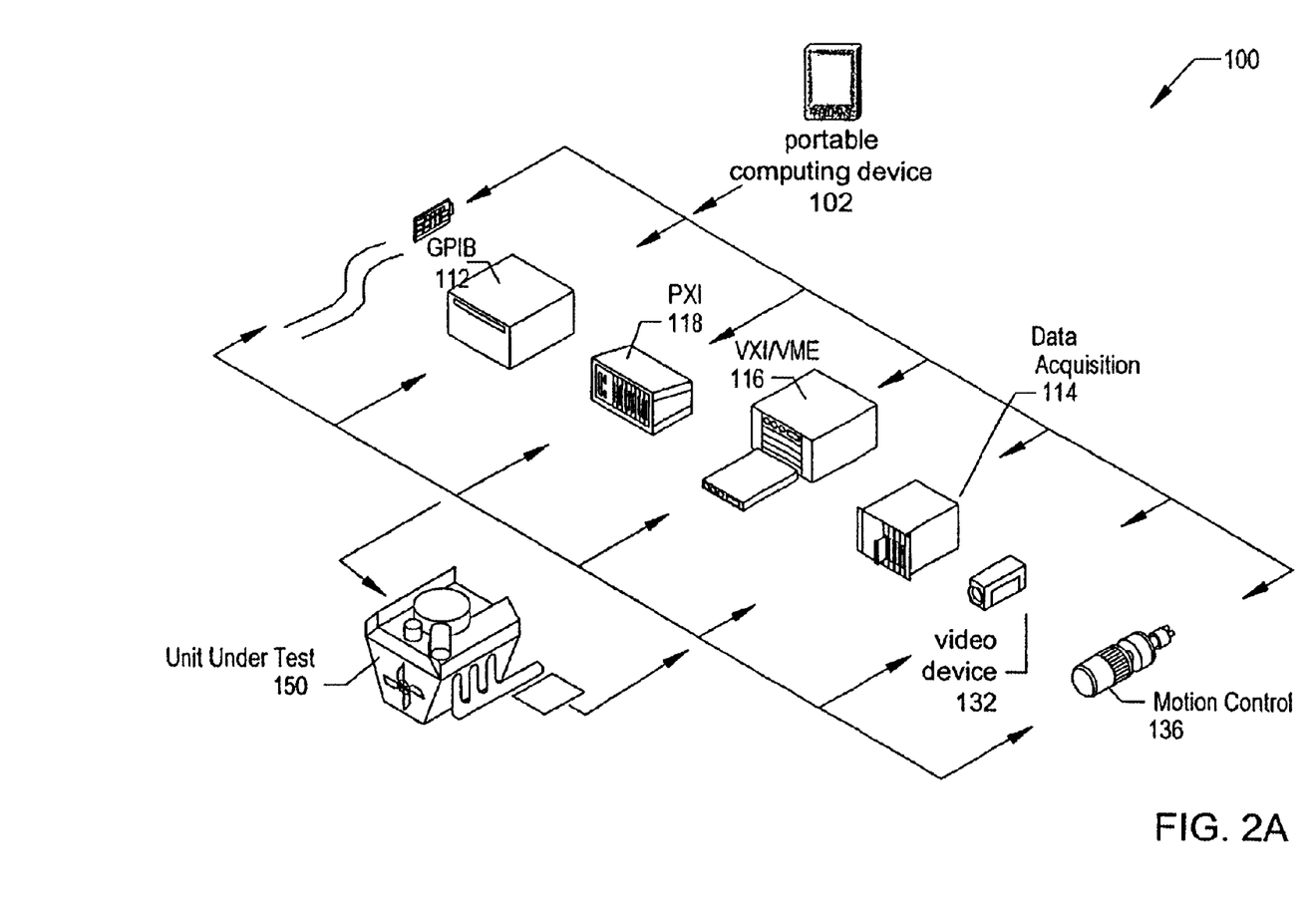
FIG. 2A illustrates an exemplary instrumentation control system.
Figure 2B:
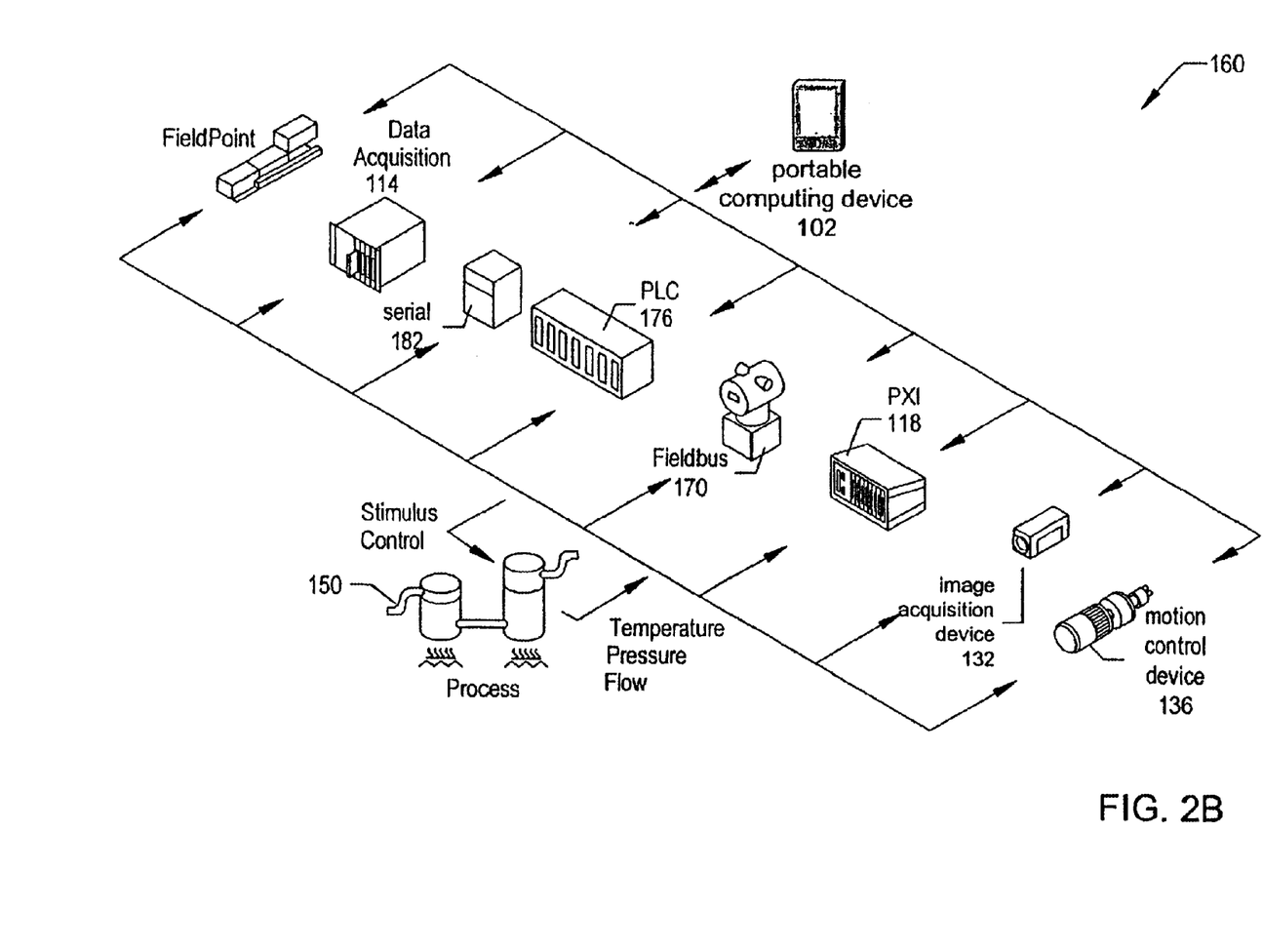
FIG. 2B illustrates an exemplary industrial automation system.

FIGS. 2A and 2B—Instrumentation and Industrial Automation Systems

The following describes embodiments of the present invention involved with performing test and/or measurement functions and/or controlling and/or modeling instrumentation or industrial automation hardware. However, it is noted that the present invention can be used for a plethora of applications and is not limited to instrumentation or industrial automation applications. In other words, the following description is exemplary only, and the present invention may be used for any desired purpose. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, games, etc.

FIG. 2A illustrates an exemplary instrumentation control system 100. The system 100 comprises a portable computing device 102, e.g., a PDA device, which may couple (in a wired or wireless manner) to one or more instruments. The portable computing device 102 may connect to the one or more instruments in any of various ways, and preferably connects wirelessly, i.e., communication between the portable computing device 102 and the one or more instruments is performed using a wireless communication protocol. In one embodiment, the portable computing device 102 may operate with the one or more instruments to analyze, measure, or control a unit under test (UUT) or process 150.

The one or more instruments may include a GPIB instrument 112, a data acquisition (DAQ) instrument 114, a VXI instrument 116, a PXI instrument 118, a video device or camera 132, and/or a motion control device 136, among other types of devices.

The GPIB instrument 112 may couple to the portable computing device 102 via a wireless communication protocol. For example, the GPIB instrument 112 may include wireless communication circuitry for communicating with an external device. In a similar manner, the video device 132, the motion control device 136, the VXI instrument 116, the PXI instrument 118, and/or the data acquisition instrument 114 may connect to the portable computing device 102 wirelessly. The data acquisition instrument 114 may interface through signal conditioning circuitry to the UUT. The signal conditioning circuitry may comprise an SCXI (Signal Conditioning eXtensions for Instrumentation) chassis comprising one or more SCXI modules.

In another embodiment, the GPIB instrument 112, the video device 131, the motion control device 136, the data acquisition instrument 114, the VXI instrument 116, and/or the PXI instrument 118 may be physically connected to the portable computing device 102, e.g., via a serial cable.

A serial instrument (not shown) may also be coupled to the portable computing device 102, e.g., wirelessly or through a serial port provided by the portable computing device 102. In typical instrumentation control systems an instrument will not be present of each interface type, and in fact many systems may only have one or more instruments of a single interface type, such as only GPIB instruments.

The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, a hardware-in-the-loop validation application, or any of various other types of applications.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 may comprise a portable computing device 102 that may couple (in a wired or wireless manner) to one or more devices or instruments. The portable computing device 102 may connect to the one or more devices or instruments in any of various ways, and preferably connects wirelessly, i.e., communication between the portable computing device 102 and the one or more devices or instruments is performed using a wireless communication protocol. In one embodiment, the portable computing device 102 may operate with the one or more devices to a process or device 150 to perform an automation function, such as MMI (Man Machine Interface), SCADA (Supervisory Control and Data Acquisition), portable or distributed data acquisition, process control, advanced analysis, or other control.

The one or more devices may include a data acquisition instrument 114, a PXI instrument 118, an image acquisition device 132, a motion control device 136, a fieldbus device 170, a PLC (Programmable Logic Controller) 176, a serial instrument 182, or a distributed data acquisition system, such as the Fieldpoint system available from National Instruments, among other types of devices. As described above, these devices may interface with the portable computing device 102 in any of various ways, e.g., wirelessly or using a physical connection. In typical industrial automation systems a device will not be present of each interface type, and in fact many systems may only have one or more devices of a single interface type, such as only PLCs. The devices may be coupled to the device or process 150.

As used herein, the term "instrument" is intended to include any of the devices that are adapted to be connected to a portable computing device as shown in FIGS. 2A and 2B, traditional "stand-alone" instruments, as well as other types of measurement and control devices. The term "measurement function" may include any type of data acquisition, measurement or control function, such as that implemented by the instruments shown in FIGS. 2A and 2B. For example, the term "measurement function" includes acquisition and/or processing of an image. As described below, a graphical program may be created that implements a measurement function. For example, the graphical program may execute on the portable computing device to acquire a signal and perform the measurement function on the acquired signal.

Graphical software programs which perform data acquisition, analysis and/or presentation, e.g., for measurement, instrumentation control, industrial automation, or simulation, such as in the applications shown in FIGS. 2A and 2B, may be referred to as virtual instruments.

In one embodiment, the graphical program executing on the portable computing device 102 may be used to perform only a portion of the applications described above. For example, the portable computing device may provide a convenient way to gather data acquired from instruments located in the field or on a factory floor. The data gathered by the portable computing device may then be downloaded to another computer system for further analysis or display.

Figure 3:
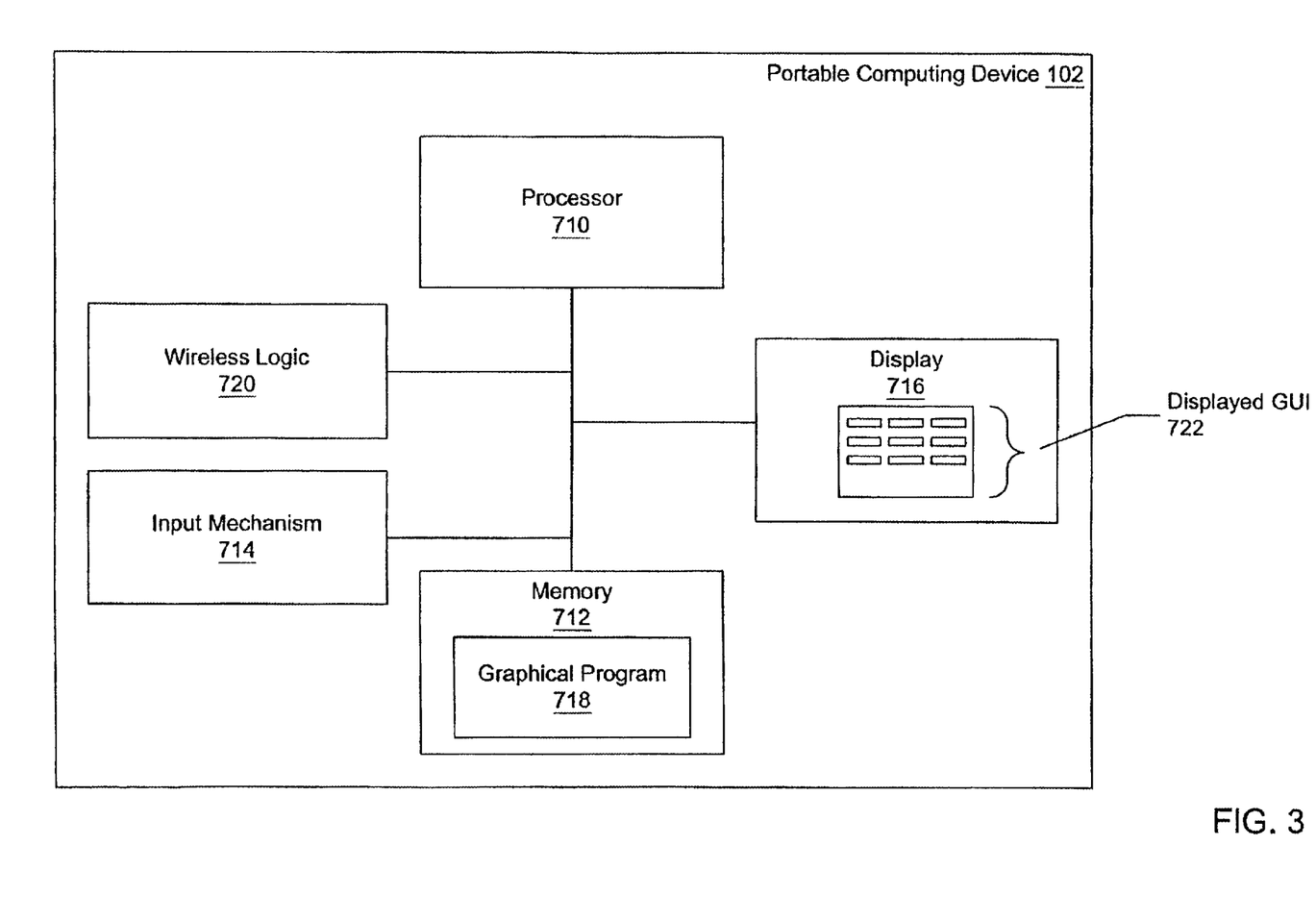
FIG. 3 is a block diagram illustrating one embodiment of a portable computing device, e.g., a PDA, operable to receive and execute a graphical program.

FIG. 3—Portable Computing Device Block Diagram

FIG. 3 is a block diagram illustrating one embodiment of a portable computing device 102 operable to receive and execute a graphical program. The portable computing device 102 may be any of various types of portable computing device. Examples of portable computing devices include personal digital assistants (PDAs), mobile terminals, handheld computers, wearable devices (e.g., wristwatch computers), "smart" cellular telephones, game consoles, global positioning system (GPS) units, electronic textbook devices, etc. New classes of portable computing device are rapidly emerging, and this is not intended to be an exhaustive list.

As shown in FIG. 3, the portable computing device 102 may include a processor 710. The processor 710 may be any of various types, including a digital signal processor (DSP), an x86 processor, e.g., a Pentium class processor, a PowerPC processor, as well as others. The processor 710 may have various clock speeds, including clock speeds similar to those found in desktop computer-class processors, as well as lower speeds such as 16 MHz.

The portable computing device 102 may also include a memory 712 coupled to the processor 710. The memory 712 may comprise any of various types of memory, including DRAM, SRAM, EDO RAM, flash memory, etc., or a non-volatile memory such as a magnetic media, e.g., a hard drive, or optical storage. The memory 712 may comprise other types of memory as well, or combinations thereof. In one embodiment, the memory 712 may have a small storage capacity compared to a typical desktop computer system.

The portable computing device 102 may also include wireless logic 720 for receiving data wirelessly from other devices, such as a desktop computer system. The wireless logic 720 may be operable to communicate with external devices using any of various wireless protocols. In other embodiments, the portable computing device 102 may include other means for communicating with other devices, such as logic for performing serial communication.

As shown in FIG. 3, the memory 712 may store a graphical program 718. The graphical program 718 may perform any function, such as a test and/or measurement function, an industrial automation function, a process control function, a data acquisition function, a motion control function, a simulation function, etc., or a general purpose software application such as a database application, a calendar application, a game, etc.

The portable computing device 102 may also comprise a display 716. The display 716 may be any of various types, such as an LCD (liquid crystal display). The display for a typical portable computing device may be small compared to the display of a desktop computer system. A graphical user interface (GUI) 722 for the graphical program may be displayed on the display 716. The processor 710 executing code and data from the memory 712 may provide a means for generating and displaying the GUI.

The portable computing device 102 may also comprise an input mechanism 714. The input mechanism 714 may be any of various types, as appropriate for a particular portable computing device. For example, the input mechanism may comprise a keypad, trackball, touch pen, microphone, modem, infrared receiver, etc.

Figure 4:
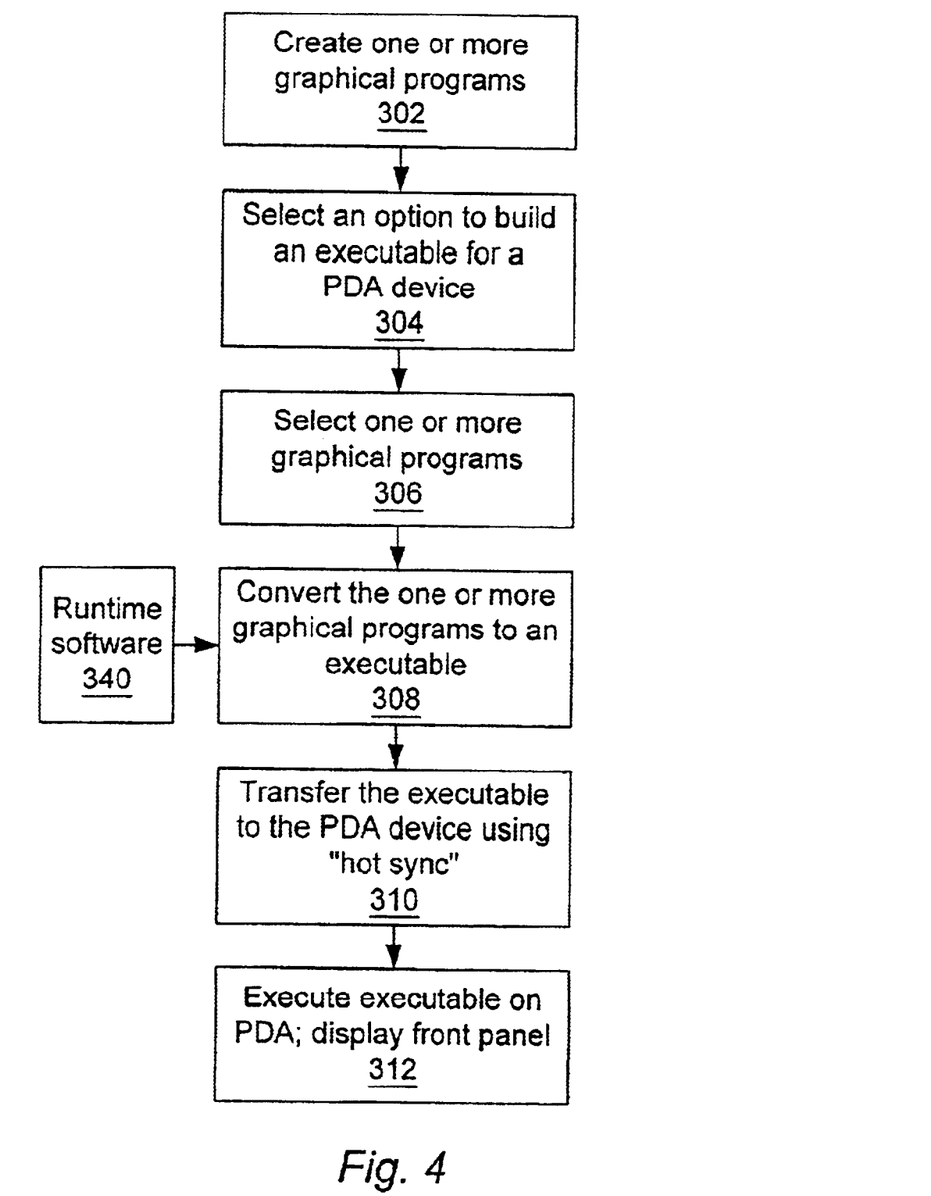
FIG. 4 is a flowchart diagram illustrating one embodiment of a method for deploying one or more graphical programs on a portable computing device, such as a PDA.

FIG. 4

FIG. 4 is a flowchart diagram illustrating one embodiment of a method for deploying one or more graphical programs on a portable computing device, such as a personal digital assistant (PDA) device. It is noted that FIG. 4 illustrates one exemplary embodiment, and other embodiments are also contemplated.

As shown, in step 302 one or more graphical programs may be created. The one or more graphical programs may comprise a main graphical program and one or more sub-graphical programs. Alternatively the one or more graphical programs may comprise a plurality of graphical programs which interoperate with each other in either a client server or peer-to-peer relationship. Alternatively, only a single graphical program may be created.

The graphical program(s) may be created or assembled by the user arranging on a display a plurality of nodes or icons and then interconnecting the nodes to create the graphical program(s). In response to the user assembling the graphical program, data structures may be created and stored which represent the graphical program. The nodes may be interconnected in one or more of a data flow, control flow, and/or execution flow format. The graphical program may thus comprise a block diagram having a plurality of interconnected nodes or icons that visually indicate the functionality of the program. The graphical program may implement any desired function.

As noted above, the graphical program may comprise a block diagram and may also include a user interface portion or front panel portion. Where the graphical program includes a user interface portion, the user may assemble the user interface on the display. As one example, the user may use the LabVIEW graphical programming development environment to create the graphical program.

In an alternate embodiment, the graphical program may be created in step 302 by creating or specifying a prototype, followed by automatic or programmatic generation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired.

It is noted that the graphical user interface and the block diagram may be created separately or together, in various orders, or in an interleaved manner. In one embodiment, the user interface elements in the graphical user interface or front panel may be specified or created, and terminals corresponding to the user interface elements may appear in the block diagram in response. For example, when the user places user interface elements in the graphical user interface or front panel, corresponding terminals may appear in the block diagram as nodes that may be connected to other nodes in the block diagram, e.g., to provide input to and/or display output from other nodes in the block diagram. In another embodiment, the user interface elements may be created in response to the block diagram. For example, the user may create the block diagram, wherein the block diagram includes terminal icons or nodes that indicate respective user interface elements. The graphical user interface or front panel may then be automatically (or manually) created based on the terminal icons or nodes in the block diagram. As another example, the graphical user interface elements may be comprised in the diagram.

In step 304 the user may select an option to build an executable for the portable computing device, e.g., PDA device. For example, the user may select an option from a menu in the graphical programming development environment, e.g., LabVIEW, to create a "build" or select an option to build an executable that will execute on a PDA device.

In response to the user selecting this build option in step 304, in step 306 the user may be prompted to specify or select one or more graphical programs from which the user desires to create the executable. As one example, this may involve selecting the graphical program(s) created in step 302. For example, the user may select one main graphical program and a plurality of sub-graphical programs. Alternatively, the user may select a single graphical program or a plurality of different graphical programs for which the user desires to create an executable. The user may select the one or more graphical programs in any of various ways. For example, selecting the graphical program(s) may comprise the user browsing through a file system to obtain the graphical programs, or dragging and dropping icons from a palette, or other appropriate selection methods.

In an alternative embodiment, it may not be necessary to select the "build" option and then specify the graphical program(s) to include in the build. For example, if the user is currently viewing or editing a graphical program within the graphical programming development environment, then the user may simply select a "Deploy to PDA" menu option to deploy the current graphical program to the portable computing device.

In another embodiment, steps 304 and 306 may be performed using graphical association or "drag and drop" techniques. For example, the system may display a configuration diagram which includes icons for respective graphical programs and an icon for the PDA device. In this example, the user may deploy one or more graphical programs on a PDA by dragging and dropping one or more graphical program icons on the PDA icon.

In step 308 the one or more selected graphical programs may be converted to an executable format that can be executed by the portable computing device. A software program may operate to automatically, i.e., programmatically, convert the one or more graphical programs to the executable format. For example, the one or more graphical programs may be initially represented as a plurality of data structures that define or specify the operation of the respective graphical programs. The conversion software program may operate to access these data structures from memory and convert the data structures to an executable format, e.g., machine language code or an interpretable script or other similar executable format, wherein this executable can be executed by the portable computing device.

Figure 6:
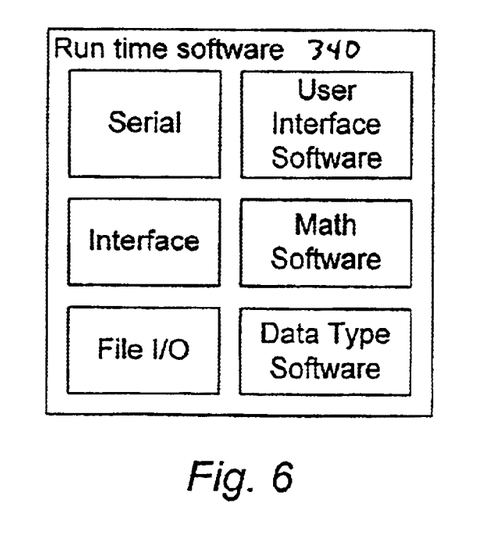
FIG. 6 illustrates run-time software used to facilitate conversion of a graphical program to an executable format that can execute on a portable computing device such as a PDA.

As shown, during the conversion process in step 308, various run-time software 340 may be used to facilitate generation of the executable from the graphical program(s). As shown in FIG. 6, this run-time software may comprise serial, interface, and file I/O software, as well as user interface software, math software, and data type software.

This run-time software 340 may be useful and/or necessary because the portable computing device may not inherently include a graphical program execution engine. A graphical program execution engine may be described as a software program that is designed to execute graphical programs. A graphical program execution engine may include various software for handling user interface issues and display certain GUI elements, performing certain math functions, handling certain data types, performing file I/O, and performing various interface or serial functions. Since in one embodiment the portable computing device does not include a graphical program execution engine, the run-time software 340 may add various program instructions and/or data structures to enable the resulting executable to execute and perform the functionality indicated by the graphical program. Hence, the executable may require additional information that is not already contained within the data structures that correspond to the graphical programs that have been created.

Stated another way, the graphical program may include portions that cannot execute "natively" on the portable computing device 102. In other words, the portable computing device software cannot inherently perform this functionality based on the graphical program as written, i.e., these portions cannot execute unmodified or without additional program instructions. Typically, the portions that cannot execute "natively" on the portable computing device 102 require functionality that would be present in a graphical program execution engine or other software execution program.

In step 308 the method may examine the graphical program, determine which portions of the graphical program cannot execute "natively" (e.g., without modification or additional program instructions) on the portable computing device 102, and add various program instructions and/or data structures from the run-time software 340 to account for these portions. This enables the resulting executable to perform the functionality indicated by the graphical program, despite the fact that the portable computing device 102 does not include a graphical program execution engine.

Thus, various program instructions and/or data structures from the run-time software 340 may be incorporated into the executable program in step 308. For example, as described above, the graphical user interface system of the portable computing device may not fully support all of the possible control and indicator icons present in the front panel of the original graphical program. Thus, a portion of the user interface software comprised in the run-time software 340 may be incorporated into the executable created in step 308, e.g., based on the specific GUI elements comprised in the one or more graphical programs being converted. This user interface software may thus provide appropriate program instructions for displaying or representing different user interface or front panel elements. As another example, the portable computing device software may not inherently support certain data types or math operations. Thus, various other program instructions and/or data structures from the run-time software 340 may be incorporated into the executable program in step 308 to enable the portable computing device 102 to execute the graphical program correctly, i.e., so that execution of the executable is substantially the same as execution of the graphical program on a system which includes a graphical program execution engine.

In step 310 the executable may be transferred to the portable computing device, e.g., PDA. In one embodiment, this may involve using a transfer program, such as a "hot sync" program to transfer the executable to the portable computing device. As described above with reference to FIG. 1A, the portable computing device may be physically coupled to the computer system, e.g., through a serial cable, and the executable may be transferred over this cable to the portable computing device. In another embodiment, the executable may be transferred in a wireless fashion to the portable computing device and deployed on the device in a wireless fashion.

In step 312 the executable may be executed on the portable computing device, e.g., PDA. As noted above, a graphical program may comprise a block diagram and may further comprise a user interface or front panel. During execution of the executable on the portable computing device, the portable computing device may be operable to display at least a portion or all of the user interface or front panel of the original one or more graphical programs. The user may interact with this user interface or front panel to control the executable executing on the portable computing device. For example, where the graphical program performs a measurement function, the user interface or front panel may be used to control the graphical program to accomplish various measurement or automation functions. As another example, the user interface or front panel on the portable computing device may be used to control or interact with any of the various measurement or instrumentation devices shown in FIGS. 2A and 2B.

As described above, the graphical user interface system of the portable computing device may not fully support all of the possible control and indicator icons present in the front panel of the original graphical program. However, the user interface software comprised in the run-time software 340 may have been incorporated into the executable created in step 308. This user interface software may be used to provide appropriate program instructions for displaying or representing different user interface or front panel elements. Various other run-time software incorporated into the executable may be executed in step 312.

In one embodiment of the method, one or more graphical programs that are desired for execution by the executable are not converted to executable format for transfer to the portable computing device, but rather remain on the host computer system. In this embodiment, the executable may include calls to one or more graphical programs that reside on the host computer system. Thus, during execution of the executable on the portable computing device, the executable may be operable to call these graphical programs that reside on the host computer system. As one example, one or more of the graphical programs which are deployed on the portable computing device may include a "call by reference node", wherein this node is operable when executed to call a graphical program on a computer system separate from the portable computing device. This remote invocation may use VI server techniques described in U.S. Pat. Nos. 6,102,965 and 6,064,812. Thus, the executable may call and remotely invoke a graphical program, e.g., through a wireless means or through a physical connection, such as a serial connection.

In one embodiment, the graphical program executing on the portable computing device may be debugged using a desktop computer system. For example, the desktop computer system may display an image of the block diagram of the graphical program that is actually executing on the portable computing device. The block diagram displayed on the display of the computer system may display various execution information as the block diagram executes on the portable computing device. The execution information may include visual aids such as single stepping, break points, execution highlighting (highlighting of nodes as they execute, displaying data output from respective nodes, etc.). Thus the block diagram may be viewed and used by the user in various debugging modes such as single stepping, setting break points, execution highlighting, etc.

In one embodiment, during execution of the graphical program(s) on the portable computing device, the portable computing device may be operable to transfer data to an external computer system, such as a desktop computer system. A conduit program may execute on the desktop computer system and may receive data according to a standard or proprietary format. For example, where the desktop computer system is running the LabVIEW graphical programming system, the conduit program executing on the desktop computer may convert data received from the portable computing device to a "datalog" format, which is a proprietary format used by LabVIEW which enables LabVIEW to view and use the data.

Figure 5:
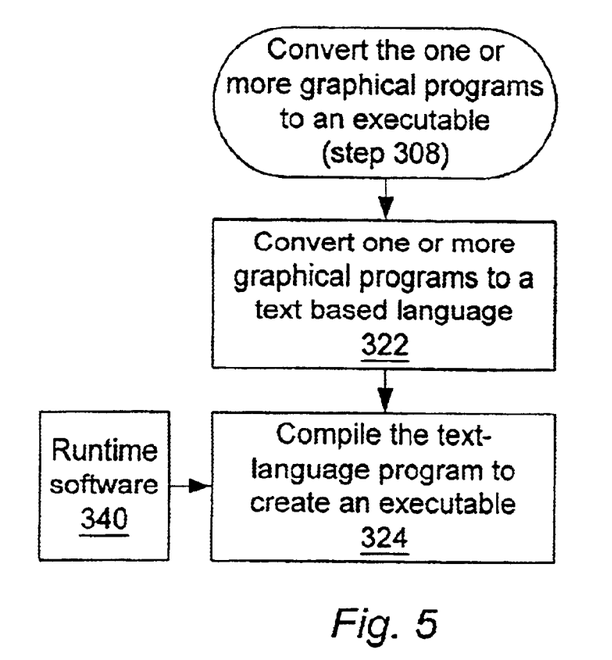
FIG. 5 is a flowchart diagram illustrating more detail of one embodiment of step 308 of FIG. 4, in which one or more graphical programs are converted to a format suitable for execution on a portable computing device.

FIG. 5

As described above with reference to the method of FIG. 4, in step 308 the selected graphical program(s) may be converted to a format suitable for execution on the portable computing device. FIG. 5 is a flowchart diagram illustrating more detail regarding step 308, according to one embodiment.

As shown, in step 322 the method may convert the one or more graphical programs to a text-based language, such as C, C++, FORTRAN, Java, Pascal, etc. Thus, for example, the one or more graphical programs may be converted to C source code, C++ source code, Java source code, etc. This may involve accessing data structures representing the one or more graphical programs and converting these data structures into a text-based programming language, similarly as described above.

In step 324 this text-based language source code may be compiled to create the executable. This compiling step may utilize the run-time software 340, as described above.

In an alternate embodiment, instead of converting the one or more graphical program(s) to an intermediate text-based programming language representation, the graphical program(s) may be converted directly to an executable.

As described above, in the conversion process of converting the one or more graphical programs to an executable, the conversion software program may access runtime software 340 which is used during the conversion process. This run-time software may comprise various components such as user interface element software, math software, data type software, serial software, interface software, file I/O software, etc. This software 340 may be used to aid in the conversion of the one or more graphical programs to an executable that can run on a different platform such as is present in a portable computing device, e.g., a PDA. In other words, portions of this software 340 may be incorporated into the executable created in step 308 to account for execution on the PDA platform.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for deploying a graphical program on a portable computing device, wherein the graphical program includes one or more user interface elements that cannot be natively displayed on the portable computing device, the method comprising:
converting the graphical program to an executable that can be executed by the portable computing device, wherein said converting the graphical program to an executable comprises:
incorporating program instructions into the executable to enable display of said one or more user interface elements on the portable computing device;
transferring the executable to the portable computing device; and
executing the executable on the portable computing device;
displaying the one or more user interface elements on a display of the portable computing device.

2. The method of claim 1,
wherein the graphical program is initially represented as a plurality of data structures that specify the operation of the graphical program;
wherein said converting the graphical program to an executable that can be executed by the portable computing device comprises converting the graphical program to executable code that can be executed by the portable computing device.

3. The method of claim 1,
wherein the portable computing device comprises a personal digital assistant (FDA) device.

4. The method of claim 1, further comprising:
creating the graphical program prior to said converting.

5. The method of claim 1,
wherein the graphical program comprises a plurality of interconnected nodes which visually indicate functionality of the graphical program.

6. The method of claim 1,
wherein the executable includes functionality that corresponds to functionality of the graphical program;
wherein said executing the executable includes performing the functionality of the graphical program.

7. The method of claim 1, wherein the graphical program includes portions that cannot execute natively on the portable computing device;
wherein said converting the graphical program to an executable comprises:
examining the graphical program to determine said portions that cannot execute natively on the portable computing device;
incorporating program instructions into the executable in response to said examining;
wherein said incorporated program instructions enable said portions to execute on the portable computing device.

8. The method of claim 1, wherein the graphical program includes one or more data types that cannot be natively handled on the portable computing device;
wherein said converting the graphical program to an executable comprises:
incorporating program instructions into the executable to enable handling said one or more data types on the portable computing device.

9. The method of claim 1, wherein the graphical program includes one or more math functions that cannot be natively performed on the portable computing device;
wherein said converting the graphical program to an executable comprises:
incorporating program instructions into the executable to enable performance of the one or more math functions on the portable computing device.

10. The method of claim 1, wherein the graphical program is designed to be executed by a graphical program execution engine;
wherein the portable computing device does not include a graphical program execution engine.

11. The method of claim 1, wherein the graphical program is designed to be executed by a software execution engine;

wherein the portable computing device does not include a software execution engine;

wherein said converting the graphical program to an executable comprises:

examining the graphical program to determine portions that require functionality of the software execution engine;

incorporating program instructions into the executable in response to said examining, wherein said incorporated program instructions enable said portions to execute on the portable computing device without use of the software execution engine.

12. The method of claim 1, wherein the portable computing device is coupled to a computer system;

wherein said executing the executable on the portable computing device includes invoking execution of at least one graphical program on the computer system.

13. The method of claim 1, wherein said converting the graphical program to an executable that can be executed by the portable computing device comprises:

converting the graphical program into a text-based program; and compiling the text-based program to produce the executable code that can be executed by the portable computing device.

14. The method of claim 1, further comprising:

displaying execution information on a display device of a second computing device in response to said executing;

wherein the second computing device is coupled to the portable computing device through one of a wired or wireless medium;

wherein the execution information is useable in debugging the graphical program.

15. The method of claim 14, further comprising:

receiving user input to the second computing device to debug the execution.

16. A system for deploying a graphical program on a portable computing device, the system comprising:

a computer system including:

a processor storing program instructions;

a memory medium that stores the graphical program;

a portable computing device, wherein the portable computing device includes a display, wherein the display is operable to display at least one user interface element, wherein the graphical program includes one or more user interface elements that cannot be natively displayed on the portable computing device;

wherein the processor of the computer system is operable to execute the program instructions to:

convert the graphical program to an executable that can be executed by the portable computing device, wherein said converting the graphical program to an executable comprises incorporating program instructions into the executable to enable display of said one or more user interface elements on the portable computing device; and transfer the executable to the portable computing device;

wherein the portable computing device is operable to execute the executable.

17. The system of claim 16, wherein the portable computing device comprises a personal digital assistant (PDA) device.

18. A system for executing a graphical program on a portable computing device, wherein the graphical program includes one or more user interface elements that cannot be natively displayed on the portable computing device, the system comprising:

means for converting the graphical program to an executable that can be executed by the portable computing device, wherein the graphical program comprises a plurality of interconnected nodes which visually indicate functionality of the graphical program, and wherein said means for converting the graphical program to an executable comprises:

means for incorporating program instructions into the executable to enable display of said one or more user interface elements on the portable computing device;

means for transferring the executable to the portable computing device;

means for executing the executable on the portable computing device; and means for displaying one or more user interface elements on a display of the portable computing device.

19. The system of claim 18, wherein the portable computing device comprises a personal digital assistant (PDA) device.

* * * * *

UNITED STATES PATENT AND TRADEMARK OFFICE
CERTIFICATE OF CORRECTION

PATENT NO. : 6,876,368 B2
DATED : April 5, 2005
INVENTOR(S) : Dove et al.

It is certified that error appears in the above-identified patent and that said Letters Patent is hereby corrected as shown below:

Column 18,
Line 21, please delete "(FDA)" and substitute -- (PDA) --.

Signed and Sealed this

Fourteenth Day of June, 2005

JON W. DUDAS
*Director of the United States Patent and Trademark Office*